United States Patent
Yasrebi et al.

(10) Patent No.: US 8,510,398 B2
(45) Date of Patent: Aug. 13, 2013

(54) APPARATUS AND METHOD FOR MANAGING MESSAGE COMMUNICATION

(75) Inventors: Mehrad Yasrebi, Austin, TX (US);
James Jackson, Austin, TX (US);
Cheryl Lockett, Austin, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 307 days.

(21) Appl. No.: 12/965,371

(22) Filed: Dec. 10, 2010

(65) Prior Publication Data
US 2012/0150968 A1    Jun. 14, 2012

(51) Int. Cl.
*G06F 15/16*    (2006.01)

(52) U.S. Cl.
USPC ............ 709/206; 709/227; 709/223; 709/246

(58) Field of Classification Search
USPC ................. 709/206–207, 227–228, 223, 246, 709/203
See application file for complete search history.

(56) References Cited

U.S. PATENT DOCUMENTS

| | | | |
|---|---|---|---|
| 2003/0054810 A1 | 3/2003 | Chen | |
| 2004/0117484 A1 | 6/2004 | Singer | |
| 2004/0172481 A1* | 9/2004 | Engstrom | 709/239 |
| 2005/0010679 A1* | 1/2005 | Yamaga et al. | 709/232 |
| 2006/0069778 A1* | 3/2006 | Ikegawa | 709/225 |
| 2007/0027857 A1 | 2/2007 | Deng | |
| 2007/0050501 A1 | 3/2007 | Alston | |
| 2009/0082038 A1* | 3/2009 | McKiou et al. | 455/456.6 |
| 2009/0156177 A1* | 6/2009 | Aaron | 455/414.1 |
| 2009/0325609 A1 | 12/2009 | Rosen | |
| 2012/0079606 A1* | 3/2012 | Evans et al. | 726/28 |

* cited by examiner

*Primary Examiner* — Philip B Tran
(74) *Attorney, Agent, or Firm* — Guntin & Gust, PLC; Ralph Trementozzi

(57) ABSTRACT

A system that incorporates teachings of the present disclosure may include, for example, receiving from a first communication device a message and a message request at a messaging server, selecting a second communication device from a group of other communication devices, providing a notification of the message to the second communication device, providing a message to the second communication device when the second communication device transmits an access request to the messaging server in response to the notification, and establishing a communication session between the first and second communication devices using the messaging server when the second communication device transmits a session request to the messaging server in response to receiving the message. Other embodiments are disclosed.

20 Claims, 5 Drawing Sheets

400

APPARATUS AND METHOD FOR MANAGING MESSAGE COMMUNICATION

FIELD OF THE DISCLOSURE

The present disclosure relates generally to device communication and messaging between devices.

BACKGROUND

Providing messages between communication devices, including wireless and mobile devices, can be done directly through transmitting the data therebetween. Use of an intermediary, such as an electronic mailbox, can save time and effort but still requires the sender to make each of the recipients aware of the existence of the message. Additionally, not all of the recipients may be able to gain access to the electronic mailboxes.

DETAILED DESCRIPTION

Figure 1:
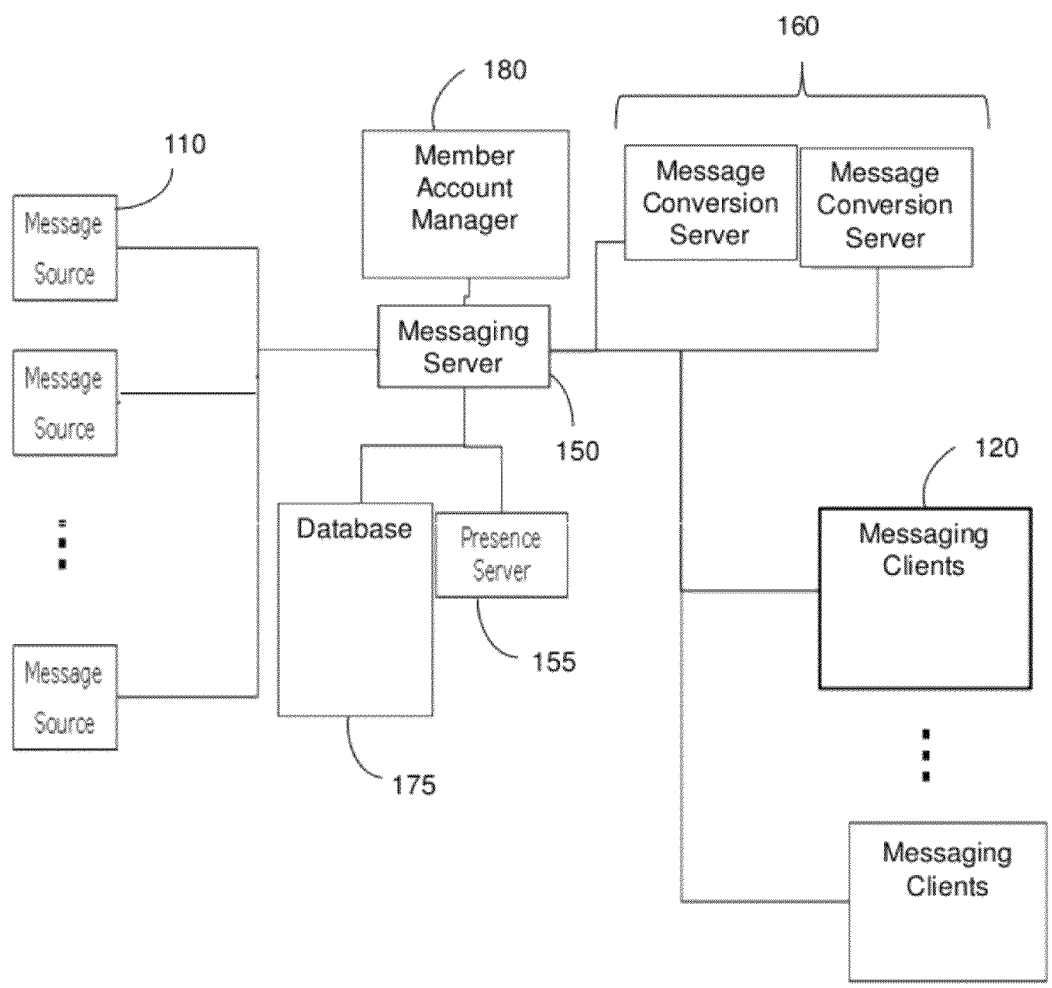
FIG. 1 depicts an illustrative embodiment of a communication system that provides messaging services.

The present disclosure describes, among other things, illustrative embodiments of devices and techniques where various types of messages that are received in a network mailbox of a user are converted to a format (e.g., audio, text, and so forth) on-demand, as suitable for the intended recipient's currently-used device. The converted messages can be presented to that user as desired. Users of the embodiments do not need to monitor their network mailbox using various access mechanisms. The exemplary embodiments can find the intended recipients; inform them of availability of an arrived message on the device(s) that he or she may be available on; convert a format of the message or portions thereof into the format that is available on the target device (e.g., the mobile smartphone in an audio format or an Internet Protocol Television (IPTV) Set-top Box (STB) in a video format); and enable a communication session between the two or more users, such as on a common medium of choice (e.g., connecting an IPTV sender to a mobile recipient of a message).

In one embodiment, the messages can be partitioned and delivered in portions to different devices, such as providing the text of a message to a mobile phone while delivering the message's audio content to an STB that is associated with the mobile phone. Other embodiments are contemplated by the present disclosure as described below.

One embodiment of the present disclosure can include a non-transitory computer-readable storage medium which includes computer instructions at least for receiving a message at a messaging server where the message is received from a first communication device, and for receiving a request to distribute the message where the request is received by the messaging server from the first communication device and the request comprises identification information for a group of other communication devices. The storage medium can also include computer instructions for obtaining presence information associated with the group of other communication devices, for selecting a second communication device from the group of other communication devices according to the presence information, for providing a notification of the message to the second communication device, and for providing at least a portion of the message to the second communication device when the second communication device transmits an access request to the messaging server in response to the notification. The storage medium can further include computer instructions for establishing a communication session between the first and second communication devices when the second communication device transmits a session request to the messaging server in response to receiving the at least a portion of the message, where the communication session is established by the messaging server. A presence server can operate in a mode whereby it may retrieve a list of candidate devices associated with a user or device, and respond with zero or more of such devices which may appear to be in use and ready to receive information. A presence server can operate in a another mode whereby it may retrieve a list of candidate devices associated with a user or device, and respond with zero or more of such devices regardless of whether any of such devices appear to be in use or ready to receive information.

Another embodiment includes a server having a network interface and a controller. The network interface can be configured to receive a message from a first communication device and to receive a request from the first communication device to distribute the message, where the request comprises identification information for a group of other communication devices. The controller can be configured to obtain presence information associated with the group of other communication devices, to select a second and third communication device from the group of other communication devices according to the presence information, and to partition the message into a plurality of portions. Different portions of the plurality of portions of the message can be provided to the second and third communication devices.

Another embodiment includes a method including receiving a message and a message request at a messaging server, where the message and message request are received from a first communication device and where the request comprises identification information for a group of other communication devices. The method can further include selecting a second communication device from the group of other communication devices, providing a notification of the message to the second communication device, and providing at least a portion of the message to the second communication device when the second communication device transmits an access request to the messaging server in response to the notification. The method can additionally include establishing a communication session between the first and second communication devices when the second communication device transmits a session request to the messaging server in response to receiving the at least a portion of the message, where the communication session is established by the messaging server.

In yet another embodiment, a messaging server can be utilized to customize messages based on protocols, standards and/or formats that are more compatible with the recipient devices. The customization can occur based on a number of factors, including presence information, alternative device information retrieved from a database such as a network address book, and so forth.

In one embodiment, the exemplary embodiments can store a user profile associated with the first communication device, where the user profile comprises network address information for the group of communication devices and the recipient format. In another embodiment, the exemplary embodiment can receive a return message at the messaging server, where the return message is received from the second communication device when the second communication device does not transmit a session request to the messaging server; provide a notification of the return message to the first communication device; and provide the return message to the first communication device when the first communication device transmits an access request to the messaging server in response to the notification, where a format of the return message is adjusted by the messaging server according to a sender format associated with the first communication device. In one embodiment, the communication session can be established between the first and second communication devices as a hands-free operation for at least one of the first and second communication devices. In another embodiment, the exemplary embodiments can establish a communication session between the first and second communication devices when the second communication device transmits a session request to the server in response to receiving at least a portion of the message.

Figure 4:
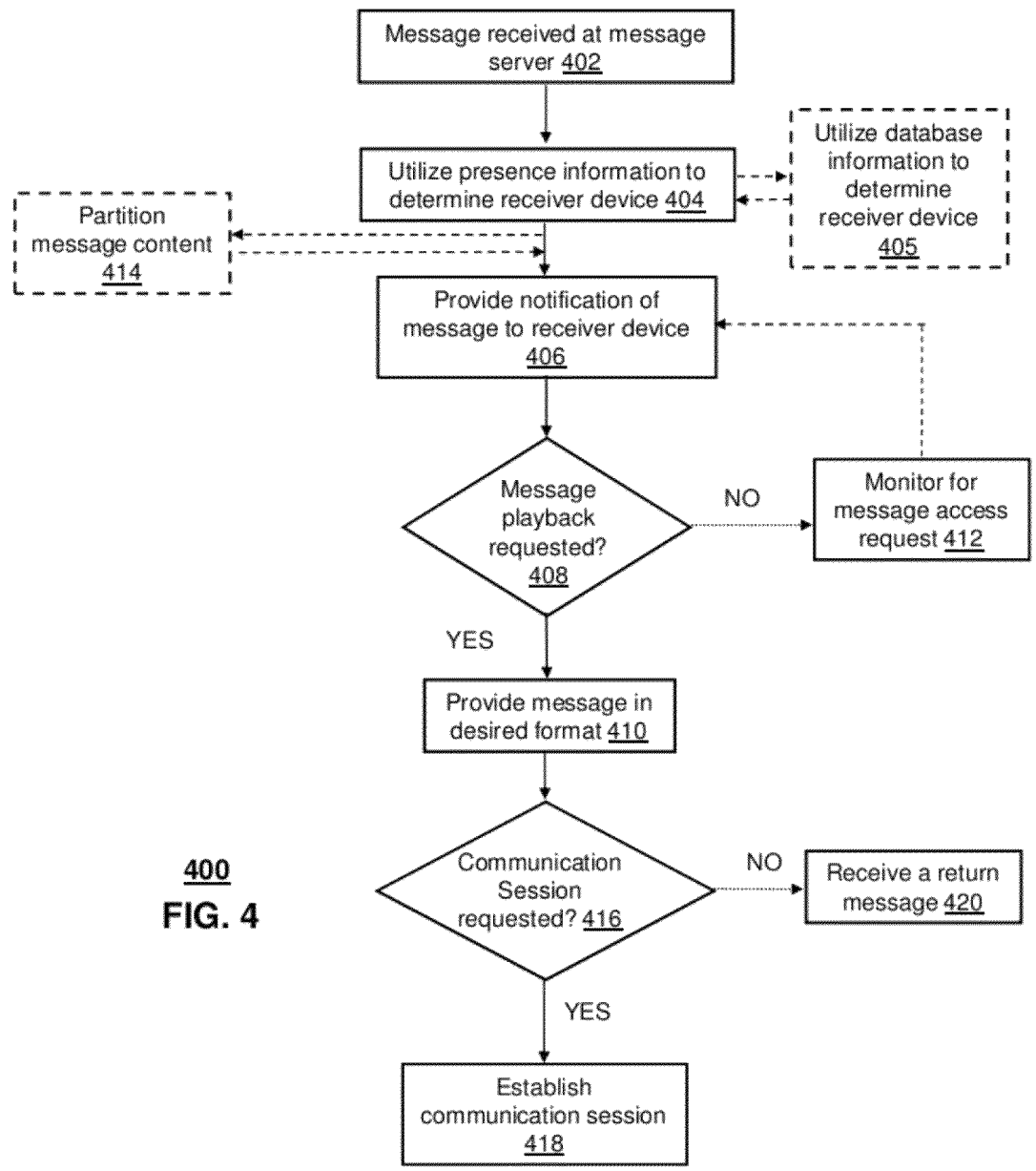
FIG. 4 depicts an illustrative embodiment of a method operating in portions of the systems and components of FIGS. 1-3.

FIG. 1 depicts an illustrative embodiment of a first communication system 100 for delivering media content that can include messages. The messages can be of various types, such as Multimedia Messaging Service (MMS), Short Messaging Service (SMS), and video mail, as well as email, audio messages and others. The lines connecting various components of FIG. 4 can represent various types of interfaces, including wired and wireless, and can be direct connections or indirect connections, such as via a network.

System 100 can include a messaging server 150. Messaging server 150 can be any number of computing devices or servers, and can be configured in various ways, such as centralized, distributed, dedicated, and/or master-slave arrangements. Messaging server 150 can be programmed to interact with one or more message sources 110 and one or more messaging clients 120. It should be understood that the message sources 110 and the messaging clients 120 can be various devices or executed through various devices, utilizing various communication protocols, including mobile or landline telephone devices, desktop computers, gaming consoles, PDA's, set top boxes and so forth. FIG. 1 illustrates a source to client flow for performing the messaging functions, but it should be understood by one of ordinary skill in the art that other data flows are also contemplated by the present disclosure.

In one embodiment, a message source 110 may be a Public Switched Telephone Network (PSTN) phone leaving a message thru a PSTN and PSTN gateway. In another embodiment, a message source 110 may be a Voice Over IP (VoIP) device computer program leaving any supported message type (e.g., audio). In yet another embodiment, a message source 110 may be operated by a subscriber, accessing the messaging server 150 through a portal, and sending any supported message type (e.g., audio, video, email, SMS, MMS, Fax, and so forth). In another embodiment, messages may be sent from a mobile device through a Short Messaging Service Center (SMSC). Various messaging clients 120 can access the message through messaging system interfaces.

System 100 can include a presence server 155 that is in communication with the messaging server 150 for providing presence information associated with a group of communication devices of the intended recipient. Message conversion servers 160, such as a speech-to-text server and a text-to-speech server, can be utilized for converting messages received and/or stored by the messaging server 150. Although the present disclosure illustrates separate servers 160 for providing these conversion functions, it is also contemplated by the present disclosure that one or more of the conversion functions can be performed by the messaging server 150.

System 100 can include a database 175 of network identification information (e.g., a network address book) that can be utilized for providing the various messaging functions, including monitoring presence information and/or establishing a communication session between selected communication devices of the users. In one embodiment, the database 175 can be populated in part by information provided in messages. For instance, message content can be parsed and analyzed to identify other communication devices that are target devices of the intended recipient(s). In embodiments, such data can be populated in database 175 using various other techniques (e.g., by users of message sources 110, and/or by messaging clients 120, and/or by a service provider (not shown), and/or using a web portal 202 (described later)). This information can then be utilized for obtaining network identification information associated with these other communication devices, where the information is stored in the database 175. In one embodiment, the database 175 can be utilized to obtain other device address information. For instance, the message can include information that is utilized in conjunction with data in the database 175 to identify one or more address identifiers (e.g., with a different service provider) which can be used for identifying other recipient devices. System 100 can include a Member Account Manager device 180 for providing account services related to the message distribution, such as account designations (e.g., Head of Household rights), billing services and so forth. A presence server can operate in a mode whereby it may retrieve a list of candidate devices associated with a user or device, and respond with zero or more of such devices which may appear to be in use and ready to receive information. A presence server can operate in a another mode whereby it may retrieve a list of candidate devices associated with a user or device, and respond with zero or more of such devices regardless of whether any of such devices appear to be in use or ready to receive information.

In one embodiment, messaging server 150 can receive messages and provide notifications to intended recipients of the messages. For example, presence information (e.g., availability of endpoint devices and/or probability of a user answering an endpoint device) can be retrieved or otherwise obtained from presence server 155 to generate notifications. The notifications can be generated by the messaging server 150 and/or by a separate device, such as a notification server (not shown). The notifications can include various information, such as message type, possible message conversions (e.g., email to audio, audio track of a video message to text, voicemail to text, and so forth); sender information; message size; and/or presence availability information about the sender which can includes the mechanisms and protocols being utilized. In one embodiment, the notification can include some audio or video multimedia file representation of this information (e.g., using text-to-speech process). In another embodiment, some of this information can be embedded in metadata (e.g., data that describes or is otherwise related to the messages including definition, structure and administration information) for use by the messaging software resident on the intended recipient's communication device, where the information may or may not be presented to the intended recipient.

Figure 2:
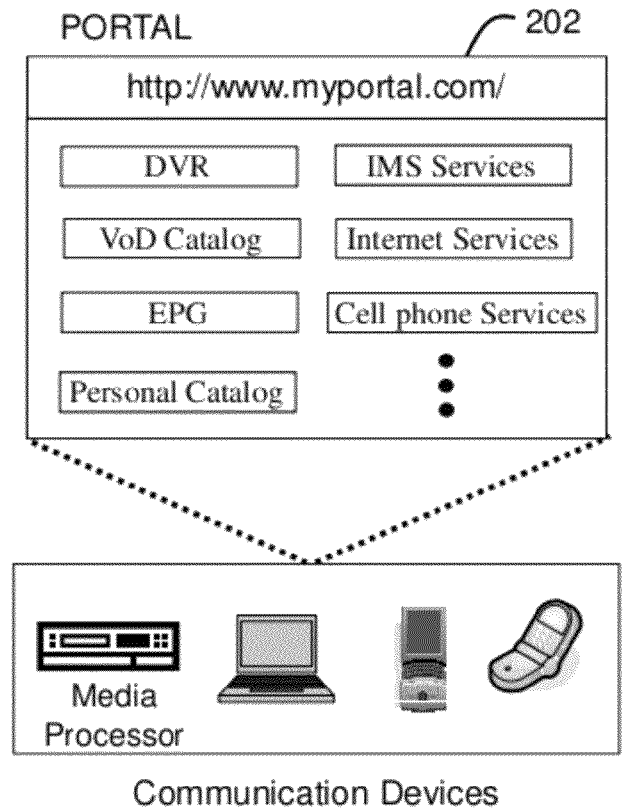
FIG. 2 depicts an illustrative embodiment of a portal that can interact with the communication system of FIG. 1.

FIG. 2 depicts an illustrative embodiment of a web portal 202 which can be hosted by server applications operating from computing devices such as the messages sources 110 or messaging clients 120 of the communication system 100 illustrated in FIG. 1. The web portal 202 can be used for managing services of communication system 100. A web page of the web portal 202 can be accessed by a Uniform Resource Locator (URL) with a Internet browser such as Microsoft's Internet Explorer™, Mozilla's Firefox™, Apple's Safari™, or Google's Chrome™ using an Internet-capable communication device such as those described for FIG. 1. The web portal 202 can be configured, for example, to access a media processor and services managed thereby such as a Digital Video Recorder (DVR), a Video on Demand (VoD) catalog, an Electronic Programming Guide (EPG), or a personal catalog (such as personal videos, pictures, audio recordings, etc.) stored in the media processor. The web portal 202 can also be used for provisioning IP Multimedia Subsystem (IMS) services (e.g., a system that enables distribution of packet switched data), provisioning Internet services, provisioning cellular phone services, populating database 175, configuring a presence server 155, configuring a messaging server 150, configuring a account manager device 180, and so on.

It is contemplated by the present disclosure that the web portal 202 can further be utilized to manage, provision and/or otherwise communicate with software applications that provide a messaging service between a plurality of users.

Illustrative embodiments of some of the methods that can operate in portions of the web portal 202 of FIG. 2 are described below.

Figure 3:
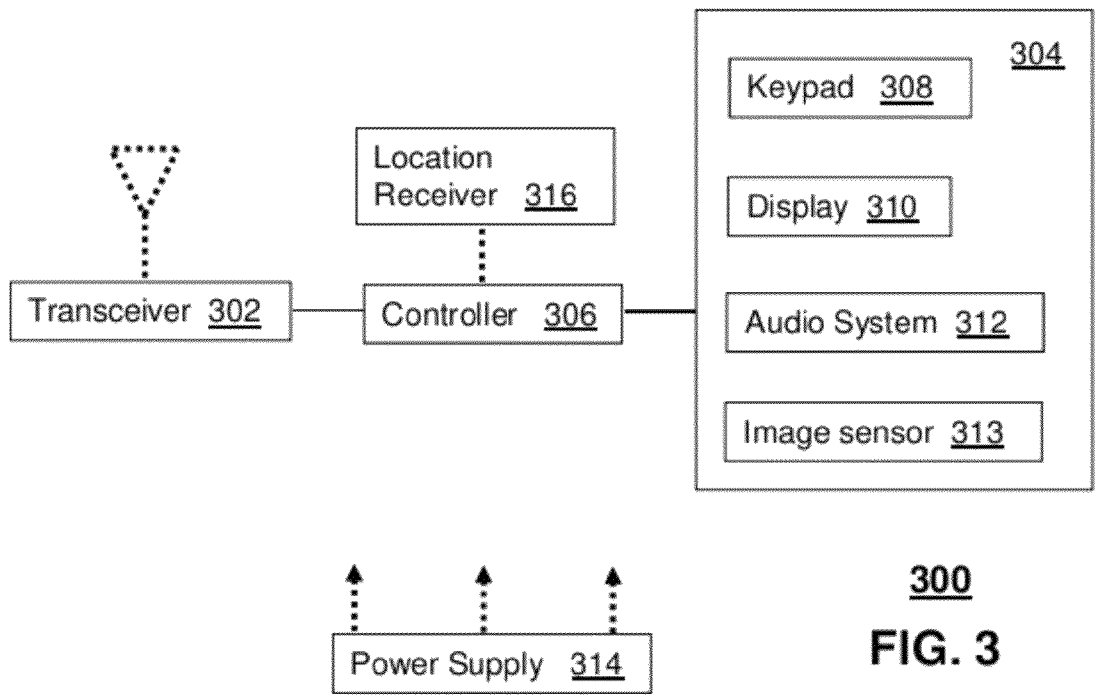
FIG. 3 depicts an illustrative embodiment of a communication device that can be utilized in the communication system of FIG. 1.

FIG. 3 depicts an exemplary embodiment of a communication device 300. Communication device 300 can serve in whole or in part as an illustrative embodiment of at least some of the devices depicted in FIG. 1. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation cellular wireless communication technologies as they arise. The transceiver 302 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, a joystick, a mouse, or a navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alphanumeric keys. The UI 304 can further include a display 310 such as monochrome or color LCD (Liquid Crystal Display), OLED (Organic Light Emitting Diode) or other suitable display technology for conveying information to an end user of the communication device 300. In an embodiment where the display 310 is touch-sensitive, a portion or all of the keypad 308 can be presented by way of the display 310 with its navigation features.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 312 can also be used for voice recognition applications. The UI 304 can further include an image sensor 313 such as a charged coupled device (CCD) camera for capturing still or moving images.

The power supply 314 can utilize power management technologies such as replaceable and rechargeable batteries, supply regulation technologies, and charging system technologies for supplying energy to the components of the communication device 300 to facilitate long-range or short-range portable applications. The location receiver 316 can utilize location technology such as a global positioning system (GPS) receiver capable of assisted GPS for identifying a location of the communication device 300 based on signals generated by a constellation of GPS satellites, thereby facilitating location services such as navigation.

In one embodiment, the GPS location information can be utilized to allow the service to enable a client application to switch modes. For instance, if the client is moving like a cell phone in a car, the cell phone can take incoming SMS messages and convert them to audio to be played to the user, and allow the user to speak to the phone and convert those messages to SMS. In other words, it could switch into audio mode if the car is moving and if it stops, it can switch into text mode depending on what the user's profile specifies.

The communication device 300 can use the transceiver 302 to also determine a proximity to a cellular, WiFi, Bluetooth or other wireless access points by common sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the message source 110 or the messaging client 120 of FIG. 1. It will be appreciated that the communication device 300 can also represent other common devices that can operate in communication system 100 of FIG. 1, such as a media player.

It is further contemplated by the present disclosure that the communication device 300 can operate as a message source and/or message recipient that interacts with messaging server 150 to provide a user with all or a portion of the functions described by the present disclosure. In one embodiment, the communication device 300 can operate as a hands-free device, including a video conferencing device, to allow for establishing a communication session between users, such as based on authorization by the users without the need for the users to actively perform any other steps to establish the communication session. In one embodiment, voice recognition software can be utilized to determine an authorization spoken by the users to establish the communication session where the session is established by the messaging server 530 (150), such as through establishing independent legs of a communication link for each of the communication devices of the users and then merging the legs of the links. The controller 306 can be adapted in various embodiments to interact with messaging server 150 to perform, or otherwise participate in, the functions described in the various embodiments throughout the disclosure. Illustrative embodiments of a method that can operate in portions of the communication device 300 of FIG. 3 are described below.

Method 400 can utilize one or more of the devices and/or techniques described with respect to FIGS. 1-3 for performing messaging functions. Method 400 can begin with step 402 in which the messaging server 150 receives a message from a first communication device, which is a message source 110. In one embodiment, the message can include media content, such as video content, still images, audio content, and so forth. The media content can be embedded in the message and/or can be a file separate from the message, such as an attachment, a link in the message to a separate file, and so forth.

In one embodiment, the media content can be captured by the first communication device directly, such as a video and/or audio recording. In another embodiment, the media content can be stored at another source and retrieved by the messaging server 150, including, but not limited to, without the first communication device having stored the media content. The messaging server 150 can store the message locally, such as in its memory, or it can be stored remotely, such as in a database accessible by the messaging server. For example, the first communication device can browse multimedia content from a remote database and instruct that the multimedia content be forwarded to a user's mailbox at the messaging server 150 without storing the content in the communication device.

In step 404, the messaging server 150 can utilize presence information associated with a group of communication devices of an intended recipient(s) of the message to determine which device of the group is most likely to present the message and/or a notification of the message to the intended recipient. Method 400 will be described with respect to an intended recipient, but it should be understood that multiple recipients are also contemplated, including establishing a communication session between the sender and multiple recipients, as will be described later. The presence information can be obtained from the presence server 155 and/or can be obtained from other sources, such as presence databases of other service provider networks.

In one embodiment, the presence information can be utilized to determine a probability that the intended recipient will review the message and/or notification of the message at a targeted device. For example, the messaging server 150 can determine that a desktop computer is being utilized for a particular purpose, such as playing an on-line video game, which may lower the probability that the user will review the notification and/or the message at that time. The messaging server 150 can utilize the presence information to determine alternative devices that the intended recipient is more likely to answer or otherwise review the notification and/or the message.

In one embodiment in step 405, in combination with the presence information or in place of the presence information, the database 175 can be utilized to obtain recipient address information, which can be utilized for delivering a message to a recipient device. The database 175 can store address or other identifying information, including information associated with other service providers or vendors, such as a hotmail address and so forth.

In another embodiment, the presence information can include presence history associated with the devices of the group of communication devices. In an embodiment, recipient and/or sender preferences (e.g., maintained in user profiles) can be obtained and used in determining the communication device to which the message and/or notification of the message is to be delivered.

The messaging server 150 may also be able to determine whether the devices within the group of communication devices can handle and support various message types, support message conversion and/or call set-up to the first communication device. This information can also be utilized in selection of the device to which the message and/or a notification of the message is to be delivered.

In step 406, the messaging server 150 can provide a recipient notification to the selected device(s) (hereinafter referred to as the second communication device) of the group of communication devices, as described above. The notification can provide various information described above with respect to system 100.

If in step 408 in response to receipt of the notification, message playback is requested or otherwise authorized by the intended recipient, then in step 410 the message can be provided by the messaging server 150 to the second communication device in a desired format. The desired format can be generated by the messaging server 150 based on a number of factors. For instance, parameters associated with the second communication device and/or a network being used by the second communication device can be obtained by the messaging server 150 and utilized to determine a desired format of the message. Other factors can also be utilized to determine the desired format, such as preferences of the recipient and/or sender. Additionally, the timing of the conversion of the message can vary. For example, the message can be converted to a desired format when the second communication device is selected by the messaging server 150.

In another embodiment, the conversion of the message can be performed on only a portion of the message initially and then the remaining portion of the message can be converted once the intended recipient requests receipt of the message. For instance, a message can include video content and text describing the sender's recommendation to the intended recipient to watch the video content. The messaging server 150 can receive the message and convert the text to a desired format of the second communication device once the second communication device is discerned by the messaging server, such as based on the presence information. Upon receipt of a request by the second communication device for playback of the message, the messaging server 150 can convert the video content into a desired format. In another embodiment, the entire message can be converted into a desired format or formats, and stored by the messaging server 150 in anticipation of a playback request from the intended recipient.

If back in step 408 in response to receipt of the notification, message playback is not requested or otherwise authorized by the intended recipient, then monitoring for message access to the stored message or a version of the message can be performed, for example by messaging server 150, as in step 412. In one embodiment, additional notification(s) can be provided to device(s) of the intended recipient, such as sending to other devices of the intended recipient or sending a repeat notification to the same device.

In one embodiment in step 414, the message can be partitioned (e.g., by messaging server 150) into two or more portions. The partitioning can be performed using a number of different techniques and/or devices, including a parsing engine. In one example, the partitioning can be performed based on the format of different aspects of the message, for instance, text can be separated from graphics. In another example, video content, whether embedded or as a separate file, can be partitioned from other aspects of the message, such as text. The partitioned portions can be processed by the messaging server 150 in different ways. For instance, referring to the example above, the text aspect of the message which includes the recommendation to watch the video content, can be provided with the notification to a mobile device of the intended recipient. The video content can then be provided to an STB of the intended recipient upon a playback request by the intended recipient. In another embodiment, the different devices receiving the different portions of the message can have functionality established or otherwise shared between them. For instance, after the STB receives the video content from the messaging server 150, the intended recipient can utilize the mobile device to perform playback functions (play, rewind, pause, and so forth) with respect to the video content being presented by the STB. This interaction between the devices can be established using the messaging server 150 or using another device.

In one embodiment, the messaging server 150 can provide different portions of the message to different devices at the same time and/or can provide different portions of the message to the same device at different times. In another embodiment, the message can be partitioned so as to apply format conversion to different portions of the message. For example, a first portion of the message may be re-formatted or re-encoded to provide a lower image resolution than a second portion of the message.

If in step 416 a communication session is requested, then in step 418 the messaging server 150 can establish the communication session, such as based on an out-dial function. In one embodiment, the request for the communication session can be made by the intended recipient after receiving and reviewing the message. In another embodiment, the request for the communication session can be received from the sender of the message, such as automatically based upon the intended recipient receiving and reviewing the message, as monitored by the messaging server 150. The communication session can be established between the first and second communication devices, or can be established between other devices associated with the sender and recipient of the message. In one embodiment, the recipient can request a communication session, such as via a speech request, depressing buttons on the recipient device and so forth.

If on the other hand in step 416, a communication session is not requested or the messaging server 150 is unable to establish a communication session between the sender and recipient, the messaging server 150 may receive a return message from or about the intended recipient's device, as in step 420. The messaging server 150 can process the return message, similar to the technique for processing the original message, such as storage, providing a notification, converting to a desired format, establishing a subsequent communication session to an original device and so forth.

Figure 5:
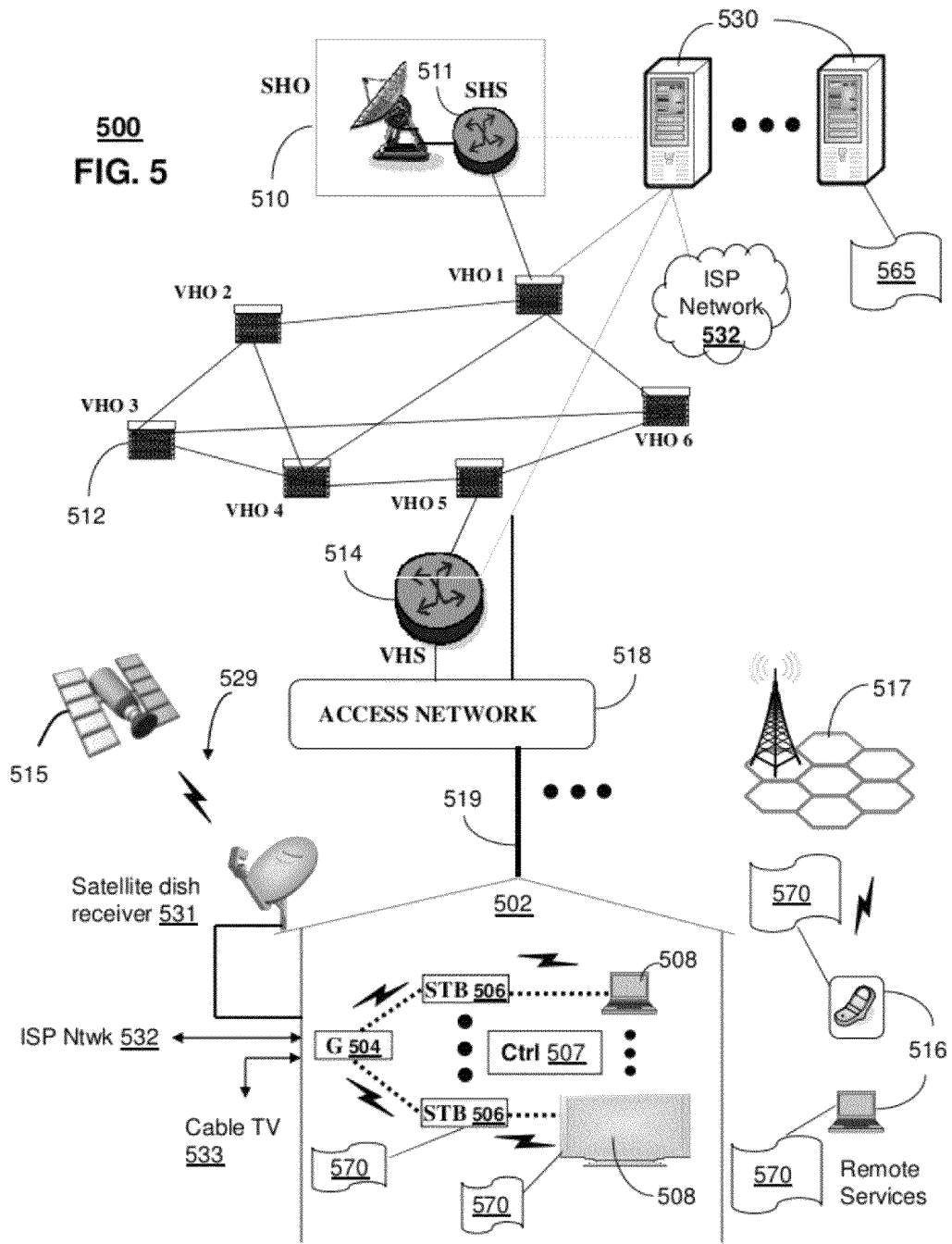
FIG. 5 depicts an illustrative embodiment of another communication system that provides media services including messaging services.

FIG. 5 depicts an illustrative embodiment of a first communication system 500 for delivering media content that can include messages. The messages can be of various types, such as Multimedia Messaging Service (MMS), Short Messaging Service (SMS), and video mail, as well as email, audio messages and others. System 500 can be operably coupled with all or a portion of system 100, and can utilize devices and techniques described with respect to FIGS. 1-4. The communication system 500 can represent an IPTV media system. The IPTV media system can include a super head-end office (SHO) 510 with at least one super headend office server (SHS) 511 which receives media content from satellite and/or terrestrial communication systems. In the present context, media content can represent, for example, audio content, moving image content such as 2D or 3D videos, video games, virtual reality content, still image content, and combinations thereof. The SHS server 511 can forward packets associated with the media content to one or more video head-end servers (VHS) 514 via a network of video head-end offices (VHO) 512 according to a multicast communication protocol.

The VHS 514 can distribute multimedia broadcast content via an access network 518 to commercial and/or residential buildings 502 that house a gateway 504 (such as a residential or commercial gateway). The access network 518 can represent a group of digital subscriber line access multiplexers (DSLAMs) located in a central office or a service area interface that provide broadband services over fiber optical links or copper twisted pairs 519 to buildings 502. The gateway 504 can use communication technology to distribute broadcast signals to media processors 506 such as STBs, which in turn present broadcast channels to media devices 508 such as computers or television sets managed in some instances by a media controller 507 (such as an infrared or RF remote control).

The gateway 504, the media processors 506, and media devices 508 can utilize tethered communication technologies (such as coaxial, powerline, or phone line wiring) or can operate over a wireless access protocol such as Wireless Fidelity (WiFi), Bluetooth, Zigbee, or other present or next generation local or personal area wireless network technologies. By way of these interfaces, unicast communications can also be invoked between the media processors 506 and subsystems of the IPTV media system for services such as video-on-demand (VoD), browsing an electronic programming guide (EPG), or other infrastructure services.

A satellite broadcast television system 529 can also be used in the media system of FIG. 5. The satellite broadcast television system 529 can be overlaid, operably coupled with, or replace the IPTV system as another representative embodiment of communication system 500. In this embodiment, signals transmitted by a satellite 515 carrying media content can be received by a satellite dish receiver 531 coupled to the building 502. Modulated signals received by the satellite dish receiver 531 can be transferred to the media processors (STBs) 506 for demodulating, decoding, encoding, and/or distributing broadcast channels to the media devices 508. The media processors (STBs) 506 can be equipped with a broadband port to the ISP network 532 to enable interactive services such as VoD and EPG as described above.

In yet another embodiment, an analog or digital cable broadcast distribution system such as cable TV system 533 can be overlaid, operably coupled with, or replace the IPTV system and/or the satellite TV system as another representative embodiment of communication system 500. In this embodiment, the cable TV system 533 can also provide Internet, telephony, and interactive media services.

It is contemplated that the present disclosure can apply to any present or next generation over-the-air and/or landline communication and/or media content services system.

Some of the network elements of the IPTV media system can also be coupled to one or more non-portable computing devices 530, a portion of which can operate as a web server for providing portal services over an Internet Service Provider (ISP) network 532 to wireline media devices 508 or wireless communication devices 516.

Multiple forms of media services can be offered to media devices over landline technologies, such as those described above. Additionally, media services can be offered to media devices by way of a wireless access base station 517 operating according to wireless access protocols such as Wireless Fidelity (WiFi), or cellular communication technologies such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on). Other present and next generation wide area wireless network technologies are contemplated by the present disclosure.

The communication system 500 can also provide for all or a portion of the computing devices 530 to function as a messaging center or system (herein referred to as messaging server 530). It should be understood that reference to messaging server 530 throughout the present disclosure is intended to describe various numbers, configurations and components of computing devices. The messaging server 530 can be a single device or a number of different computing devices, which can be utilized in a centralized and/or distributed fashion, and which can perform similar and/or different functions, including the use of dedicated devices to perform certain functions. In one embodiment, all or portions of these computing devices can be in a master-slave arrangement.

The messaging server 530 can use computing hardware and software application 565 to perform one or more of: connecting users using any of the multitude of message types; supporting dynamic, on-demand and as needed conversions of portions of various received messages; identifying of availability of users and determination of their devices dynamically; delivering of converted messages to users on their available devices (e.g., mobile smartphones, set top boxes, web portals and so forth); and establishing multimedia or other communication sessions among subscribers on-demand using various preferred session types (e.g., hands-free driving using a video call when an email is received from an IPTV user). Messaging server 530 can perform a number of content conversions including, email to speech conversion, email to SMS conversion, audio (e.g., voicemail, audio track of video mail, or audio track of MMS) to email conversion, and audio to SMS conversion.

In another embodiment, communication devices that are to be used as messaging sources and/or recipients, such as mobile devices 516, STBs 506, and so forth, can include a software application 570. It should be understood that these devices can be of various types and can utilize various protocols. For instance, the devices can be VoIP devices, landline devices, and/or portal devices, and can use MMS, SMS, video mail, email, audio messages and so forth. The application 570 can be utilized to participate in the messaging functions provided by application 565 of the messaging server 530. In one embodiment, the application 570 can be downloaded or otherwise accessed from the messaging server 530. In another embodiment, the software application 570 may require registration with the messaging server 530 before it can interact in some or all of the messaging functions described herein.

In one embodiment, messaging server 530 can perform out-dials for automatically establishing a communication session between a message sender device and a message receiving device. In another embodiment, messaging server 530 can provide on-demand message conversion and real-time availability to a recipient media device, where the user is available at the moment. The messaging server 530 can support multiple communication messaging platforms, including VoIP, wireless, landline, IPTV and/or web portals. In one embodiment, the web portal can be utilized for providing or receiving messages and interacting with the messaging server 530 for other functionality, where the web portal has account designations for head of household using a member account manager server.

In one embodiment, the messaging client application 570 can be resident on a mobile device (or other communication device), whereby a voice-activated application reads the content of an email that the user has received, upon verbal confirmation by a user driving a vehicle who has acknowledged that he or she desires to hear the contents of that email read aloud. In another example, the messaging server 530 can receive a facsimile from subscriber B, which is saved into subscriber A's mailbox, and can connect subscribers A and B on their video phones, if both users desire to establish a communication session.

Upon reviewing the aforementioned embodiments, it would be evident to an artisan with ordinary skill in the art that said embodiments can be modified, reduced, or enhanced without departing from the scope and spirit of the claims described below. For example, a selection of a device to receive a message or a desired format for the message, such as in response to the notification, can override any distribution designation previously determined by the messaging server 530 and/or provided in a user profile associated with the original device. Rules can be established with respect to the priority of overriding, such as a recipient's selection of a format for the message can override a sender's selection of the format. In another embodiment, the automatically established communication session can be between three or more users.

These are but a few examples of modifications that can be applied to the present disclosure without departing from the scope of the claims. Accordingly, the reader is directed to the claims section for a fuller understanding of the breadth and scope of the present disclosure.

Figure 6:
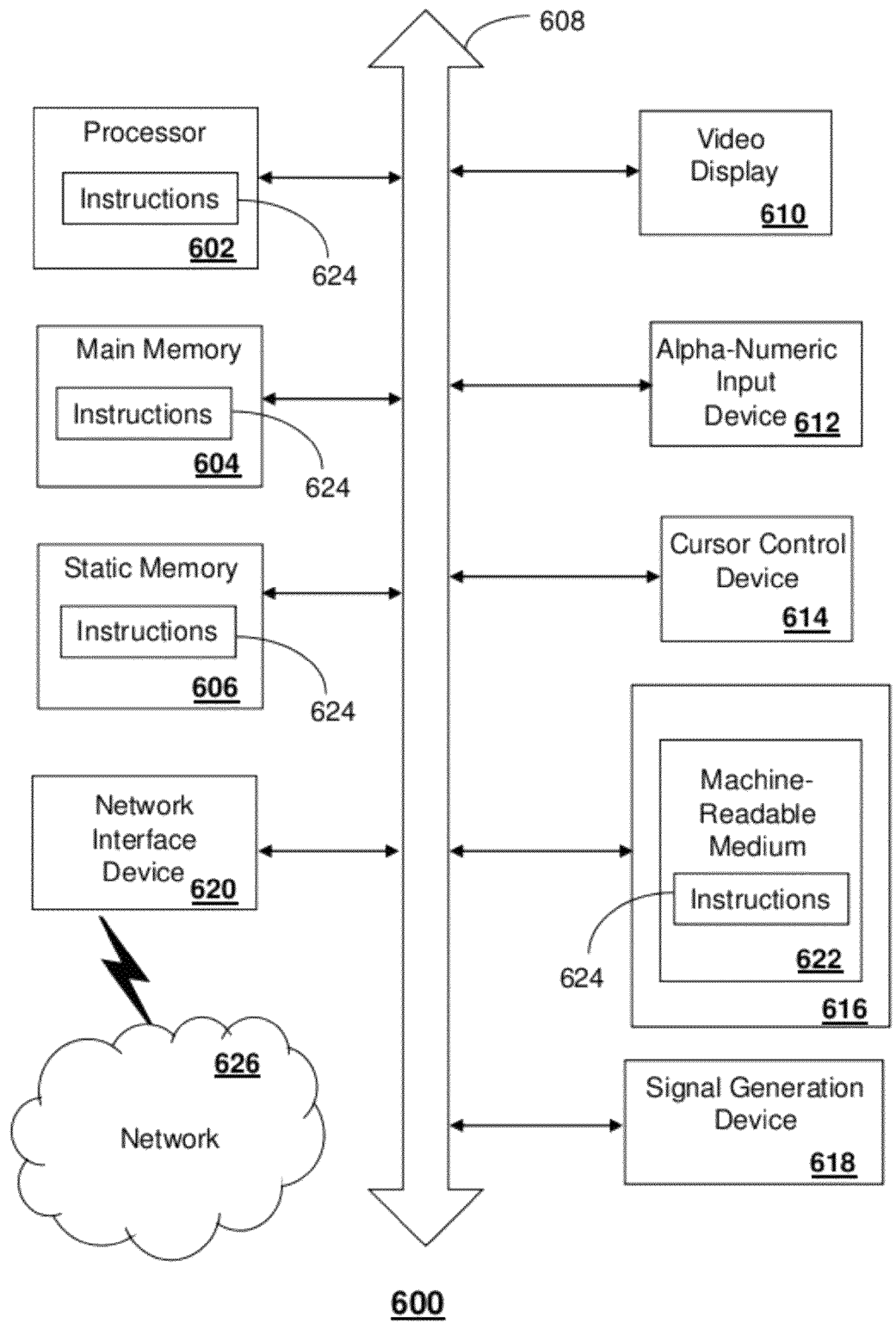
FIG. 6 is a diagrammatic representation of a machine in the form of a computer system within which a set of instructions, when executed, can cause the machine to perform any one or more of the methodologies discussed herein.

FIG. 6 depicts an exemplary diagrammatic representation of a machine in the form of a computer system 600 within which a set of instructions, when executed, may cause the machine to perform any one or more of the methods discussed above. The machine can operate, for example, as the message source 110, the recipient device or client 120, the messaging server 150 (530), the STB 506 and/or the communication devices 516. In some embodiments, the machine operates as a standalone device. In other embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor 602 (e.g., a central processing unit (CPU), a graphics processing unit (GPU), or both), a main memory 604 and a static memory 606, which communicate with each other via a bus 608. The computer system 600 may further include a video display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620.

The disk drive unit 616 may include a machine-readable medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 624, or that which receives and executes instructions 624 so that a device connected to a network environment 626 can send or receive voice, video or data, and to communicate over the network 626 using the instructions 624. The instructions 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, or encoding a set of instructions for execution by the machine and that cause the machine to perform any one or more of the methods of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; and magneto-optical or optical medium such as a disk or tape. Accordingly, the disclosure is considered to include any one or more of a machine-readable medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A non-transitory computer-readable storage medium, comprising computer instructions which, when executed by a processor, cause the processor to perform operations comprising:
receiving a message at a messaging server, the message being received from a first communication device;
receiving a request to distribute the message, the request being received by the messaging server from the first communication device, the request comprising identification information for a group of other communication devices associated with an intended recipient of the message;
selecting a second communication device of the group of other communication devices having a likelihood of presenting the message to the intended recipient, according to presence information or stored device identification information associated with the group of other communication device;

providing a notification of the message to the second communication device;

adjusting a format of the message according to a recipient format associated with the second communication device;

providing a portion of the message to the second communication device when the second communication device transmits an access request to the messaging server in response to the notification; and establishing a communication session between the first communication device and the second communication device when the second communication device transmits a session request to the messaging server in response to receiving the portion of the message, the communication session being established by the messaging server.

2. The non-transitory computer-readable storage medium of claim 1, wherein the operations further comprise:

partitioning the message into a plurality of portions; and providing different portions to respective communication devices of the group of communication devices.

3. The non-transitory computer-readable storage medium of claim 2, wherein one of the different portions of the message is video content provided to a set top box of the group of communication devices, and wherein another of the different portions of the message is provided to a mobile device of the group of communication devices.

4. The non-transitory computer-readable storage medium of claim 1, wherein the operations further comprise:

storing the message;

providing the second communication device with access to the stored message; and generating a converted message by performing a text-to-speech conversion or a speech-to-text conversion on the message, wherein the portion of the message provided to the second communication device is the converted message.

5. The non-transitory computer-readable storage medium of claim 1, wherein the operations further comprise:

maintaining the stored device identification in a database; and utilizing the stored device identification information when the presence information is unavailable.

6. The non-transitory computer-readable storage medium of claim 5, wherein the operations further comprise storing a user profile associated with the first communication device, wherein the user profile comprises network address information for the group of communication devices and the recipient format.

7. The non-transitory computer-readable storage medium of claim 5, wherein the operations further comprise:

receiving a return message at the messaging server, the return message being received from the second communication device when the second communication device does not transmit the session request to the messaging server;

providing a notification of the return message to the first communication device; and providing the return message to the first communication device when the first communication device transmits an access request to the messaging server in response to the notification, wherein a format of the return message is adjusted by the messaging server according to a sender format associated with the first communication device.

8. The non-transitory computer-readable storage medium of claim 1, wherein the communication session is established between the first communication device and the second communication device as a hands-free operation for the first communication device or the second communication device.

9. A server, comprising:

a memory to store instructions; and a controller coupled to the memory, wherein responsive to executing the instructions, the controller performs operations comprising:

receiving a message from a first communication device and a request from the first communication device to distribute the message, wherein the request comprises identification information for a group of other communication devices associated with an intended recipient of the message;

obtaining presence information associated with the group of other communication devices, to select a second communication device having a likelihood of presenting the message to the intended recipient and a third communication device from the group of other communication devices according to the presence information; and partitioning the message into a plurality of portions, wherein different portions of the message are provided to the second communication and the third communication device respectively.

10. The server of claim 9, wherein the third communication device is a set top box, wherein a portion of the message is video content provided to the set top box, and wherein the operations further comprise adjusting a format of the video content according to a recipient format associated with the set top box.

11. The server of claim 9, wherein the operations further comprise:

providing, via the network interface, a notification of the message to the second communication device; and providing the different portions of the message to the second communication device and the third communication devices when the second communication device transmits an access request to the server in response to the notification.

12. The server of claim 11, wherein the operations further comprise establishing a communication session between the first communication device and the second the communication device when the second communication device transmits a session request to the server in response to receiving a portion of the message.

13. The server of claim 9, wherein the operations further comprise adjusting a format of a portion of the message according to a recipient format associated with the second communication device or the third communication device.

14. The server of claim 13, wherein the operations further comprise:

storing a user profile associated with the first communication device, wherein the user profile comprises network address information for the group of communication devices and the recipient format; and generating a converted message by performing a text-to-speech conversion or a speech-to-text conversion on the message, wherein the portion of the message provided to the second communication device or the third communication device comprises the converted message.

15. The server of claim 9, wherein a portion of the message is video content, and wherein the operations further comprise:

storing the video content;

adjusting a format of the video content according to a recipient format associated with the third communication device; and providing the third communication device with access to the stored video content.

16. A method comprising:

receiving, by a messaging server, a message and a message request from a first communication device, the request comprising identification information for a group of other communication devices associated with an intended recipient of the message;

selecting, by the messaging server, a second communication device from the group of other communication devices having a likelihood of presenting the message to the intended recipient, according to presence information associated with the group of other communication devices;

providing, by the messaging server, a notification of the message to the second communication device;

providing, by the messaging server, a portion of the message to the second communication device when the second communication device transmits an access request to the messaging server in response to the notification; and establishing, by the messaging server, a communication session between the first communication device and the second communication device when the second communication device transmits a session request to the messaging server in response to receiving the portion of the message.

17. The method of claim 16, further comprising:
partitioning the message into a plurality of portions; and
providing different portions to respective communication devices of the group of communication devices.

18. The method of claim 17, wherein a portion of the message is video content, and further comprising:
storing the video content;
adjusting a format of the video content according to a recipient format associated with a third communication device of the group of communication devices; and
providing the third communication device with access to the stored video content.

19. The method of claim 16, further comprising:
obtaining the presence information associated with the group of other communication devices.

20. The method of claim 16, further comprising:
generating a converted message by performing a text-to-speech conversion or a speech-to-text conversion on the message, wherein the portion of the message provided to the second communication device is the converted message.

* * * * *